United States Patent [19]

Dolengowski

[11] Patent Number: 5,142,509
[45] Date of Patent: Aug. 25, 1992

[54] SEISMIC DEVICE

[75] Inventor: George A. Dolengowski, Bellaire, Tex.

[73] Assignee: Exxon Production Research Company, Houston, Tex.

[21] Appl. No.: 567,211

[22] Filed: Aug. 14, 1990

[51] Int. Cl.$^5$ .............................................. H04R 1/02
[52] U.S. Cl. .................................... 367/144; 181/120
[58] Field of Search ................ 367/144; 181/118, 120, 181/115

[56] References Cited

U.S. PATENT DOCUMENTS

| | | | |
|---|---|---|---|
| 3,653,460 | 4/1972 | Chelminski | 181/120 |
| 4,658,387 | 4/1987 | Dolengowski et al. | 367/144 |
| 4,778,027 | 10/1988 | Haugland | 181/120 |

OTHER PUBLICATIONS

Drawing from Texan Instruments, MOD I Air Gun, Exploded View of MOD I Air Gun.

Primary Examiner—Brian S. Steinberger
Attorney, Agent, or Firm—John R. Casperson; Kelly A. Morgan

[57] ABSTRACT

A sleeve for a seismic air gun exhaust chamber is disclosed. The sleeve prevents water from accumulating in the air gun exhaust chamber when the air gun is vertically positioned and provides a convenient method for regulating the volume of the air gun exhaust chamber, and thus the frequency of acoustic energy emitted by the gun. The sleeve is characterized by a false bottom which is connected to the main chamber by an orifice and passages.

13 Claims, 3 Drawing Sheets

SEISMIC DEVICE

BACKGROUND OF THE INVENTION

In one aspect, this invention relates to a seismic device. In another aspect, this invention relates to generating seismic signals in a liquid medium.

In prospecting in subsea and other areas underlying a body of water, it is desirable to provide a source of energy for propagating sonic pulses or shock waves into the water. Since water is a good conductor of sound, it is normally not necessary to generate pulses near the floor of the water body; the pulses can be, and desirably are, produced near the water surface. These pulses propagate down through the water, across the water-floor interface, into the subfloor geologic formations and are, to some extent, reflected back along the same path to an array of hydrophones positioned near the surface of the water. Analysis of the signals produced by the hydrophones can provide information concerning the structure of the subfloor geological formations and the potential for petroleum accumulations in these formations.

An air gun using high-pressure compressed air can be used to generate the seismic pulses. The gun is fired by explosively releasing compressed air from an exhaust chamber into the water.

The frequency of the acoustic output of the gun is an important design consideration and is dependent upon the volume of the exhaust chamber. It is desirable that the output of the gun have a high energy yield in a useful seismic frequency. Exhaust chamber volumes in the range of 10 cubic inches up to about 1,000 cubic inches are commonly used. In many instances, it is desirable to introduce acoustic energy over a wide range of frequency into the subsea formations in order to obtain more information from the reflected pulses. An array of air guns of different exhaust chamber volumes is thus sometimes used. A technique for easily altering exhaust chamber volume to best suit the specific environment encountered would be very desirable.

It has been further found that some air guns accumulate sea water during use if oriented in the vertical or near vertical position. As the air gun chamber gradually fills with sea water, the acoustic power of the gun decreases and the output frequency of the gun increases, changing the tuning of the gun. Since a plurality of guns are normally employed to generate signals, the change in tune of each gun filling with water complicates deconvolution of the return seismic signals. An air gun designed to prevent sea water accumulation would thus be very desirable.

SUMMARY OF THE INVENTION

In one aspect, the invention relates to an insert or sleeve for an air gun exhaust chamber. The sleeve can be used to selectively reduce exhaust chamber volume as well as to prevent water accumulation. The sleeve is preferably formed from a tubular member which has a first end, a second end, an inside surface and an outside surface. The outside surface of the tubular member preferably closely fits the inside of an air gun exhaust chamber, acting as a sleeve. The inside surface of the tubular member defines a first fluid flow path which extends from the first end of the tubular member to the second end of the tubular member. The first flow path is divided into a first portion located near the first end of the tubular member and a second portion located near the second end of the tubular member by an inwardly extending partition or wall extending across the flow path. The partition usually has a generally annular shape. The partition has a first surface facing the first end of the tubular member and a second surface facing the second end of the tubular member. An orifice extends from the first surface to the second surface. The orifice connects the first portion of the first flow path to the second portion of the first flow path. The tubular member also is provided with a means for defining a second fluid flow path connecting the second portion of the first flow path with the first portion of the first flow path from a position near the second end of the tubular member.

The above described insert or sleeve can be positioned in an air gun exhaust chamber to prevent water buildup as well as to provide a means to select a desired exhaust chamber volume by selecting an appropriate wall thickness for the sleeve.

In another aspect of the invention, there is provided a seismic air gun. The air gun comprises a housing formed by generally tubular sidewall having a longitudinal axis, a first end, a closure on the first end, a second end, and a closure on the second end. A control chamber is formed adjacent to the first end. An exhaust chamber is formed adjacent to the second end. Exhaust ports extend through the sidewall between the first end and the second end. The exhaust ports are positioned between the control chamber and the exhaust chamber. A valve stem guide is positioned along the longitudinal axis of the housing between the exhaust ports and the control chamber. A valve member is carried slidably by the valve stem guide. The valve member has a hollow stem, a first end, a first disk at the first end, a second end, and a second disk at the second end. The valve member is movable from a first position in which the exhaust chamber is isolated from the exhaust ports by the second disk to a second position in which there is communication between the exhaust chamber and the exhaust ports. According to this embodiment of the invention, a sleeve is positioned in the exhaust chamber. The sleeve has a first end, a second end, an inside surface, and an outside surface. The second end of the sleeve is positioned adjacent to the closure on the second end of the tubular sidewall. The sleeve has an inside partition which extends across the inside surface of the sleeve near the second end to form a small chamber between the partition and the closure on the second end of the sidewall where water can accumulate (hereinafter the "water reservoir"). A residual of the exhaust chamber (hereinafter the "residual exhaust chamber") remains between the partition and the second disk. The partition has an orifice extending through it connecting the water reservoir and the residual exhaust chamber. The sleeve further defines a passage which extends from the outer surface of the sleeve inwardly to the inner surface of the sleeve near the first end of the sleeve and a channel extending along the outer surface of the sleeve leading from the water reservoir to the passage.

By selecting a desired thickness and/or length for the sidewall of the sleeve, the volume of the residual exhaust chamber is predetermined. In use, when the air gun is positioned vertically or near vertically, undesired water flows by gravity through the orifice into the water reservoir and is discharged through the passage when the gun is fired.

In yet another aspect of the invention, there is provided a method for exhausting water from a seismic air gun exhaust chamber. The method comprises pressurizing the exhaust chamber with air and draining any accumulated water from the lower end of the exhaust chamber through an orifice. The water is collected in a water reservoir beneath the orifice. The gun is fired and the exhaust chamber is depressurized from the upper end. A portion of the water is reintroduced into the exhaust chamber so that it is swept out the upper end of the exhaust chamber by flow of air when the gun is fired. The invention thus provides an air gun which exhibits a stable acoustic frequency and amplitude when in use, since water cannot accumulate therein.

In another aspect of the invention, there is provided a method for regulating the exhaust chamber volume of a seismic air gun. Where the air gun body has a detachable exhaust chamber housing at least partially defining the exhaust chamber and an inside shoulder facing the exhaust chamber housing, the method is easily practiced. The technique comprises detaching the exhaust chamber housing, inserting a closely fitting sleeve into the exhaust chamber housing which has a length and diameter sufficient so as to be tightly secured between the inside flange in the gun body and the inside surface of the exhaust chamber housing when the exhaust chamber housing is reattached, and reattaching the exhaust chamber housing. The exhaust chamber volume is easily changed by selecting an appropriate wall thickness for the sleeve.

DESCRIPTION OF THE PREFERRED EMBODIMENTS

Figure 3:
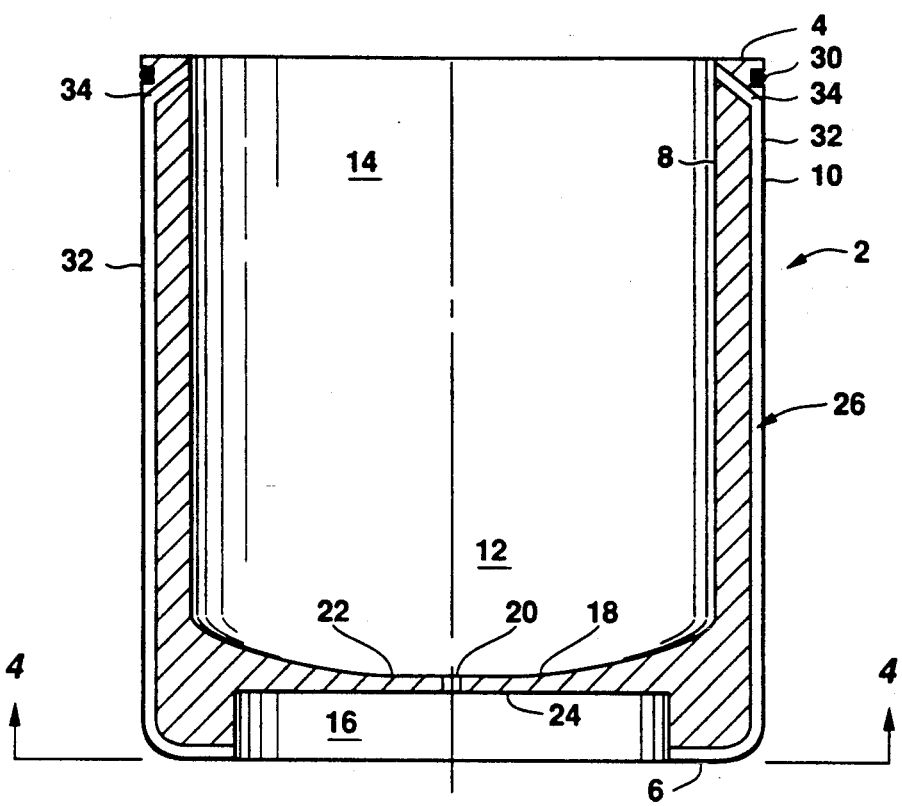
FIG. 3 is an enlarged view of the portion of the device shown in FIGS. 1 and 2 to better illustrate certain features of the present invention.
Figure 4:
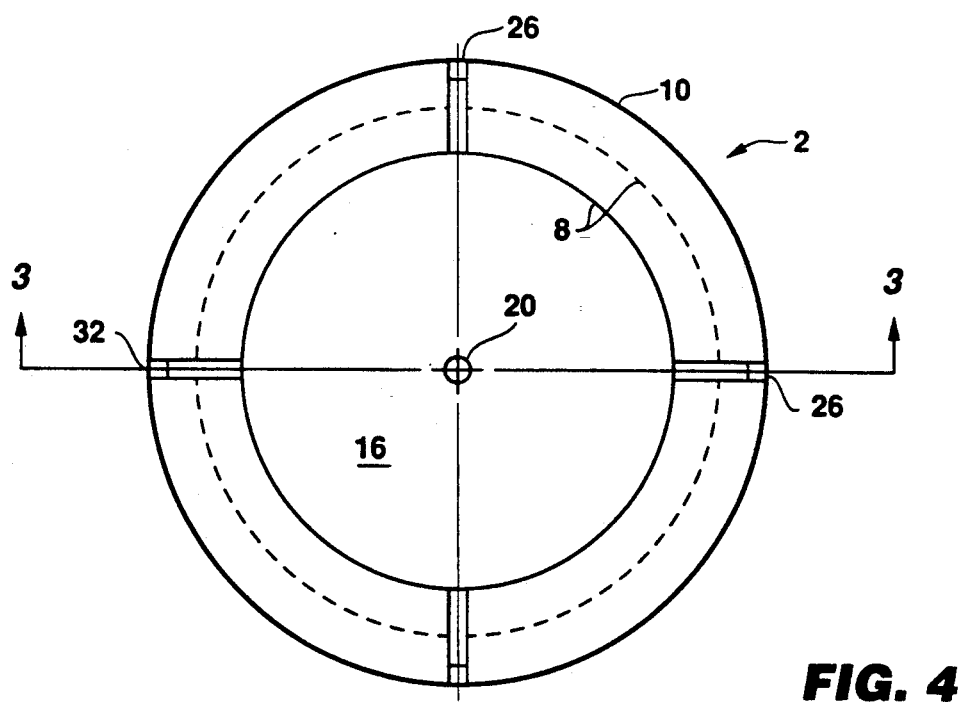
FIG. 4 is an plan view of the device in FIG. 3 when viewed along lines 4—4.

With references to FIGS. 3 and 4, a tubular member 2 forms a liner or sleeve when positioned in an air gun exhaust chamber. The tubular member 2 has a first end 4, a second end 6, an inside surface 8, and an outside surface 10. The outside surface 10 is preferably generally cylindrically shaped for close receipt by a generally cylindrical air gun exhaust chamber. The inside surface 8 forms a first fluid flow path 12 which extends from the first end 4 of the tubular member 2 to the second end 6 of the tubular member 2. The first fluid flow path 12 is divided into a first portion 14 which is located near the first end 4 of the tubular member 2 and a second portion 16 which is located near the second end of the tubular member 2 by a partition portion 18 which extends across the flow path 12. The first portion 14 and the second portion 16 of the first fluid flow path 12 are preferably generally cylindrically shaped. The partition 18 is preferably generally annularly shaped.

The partition 18 has an orifice 20 extending therethrough from a first surface 22 of the partition 18 which faces the first end 4 of the tubular member 2 to a second surface 24 of the partition 18 which faces the second end 6 of the tubular member 2. The orifice 20 connects the first portion 14 of the first fluid flow path 12 with the second portion 16 of the first fluid flow path 12. The volume of the first portion 14 of the first fluid flow path 12 is preferably many times the volume of the second portion 16 of the first fluid flow path 12, usually at least 10 times greater. Most preferably, the tubular member 2 is generally shaped like a cup which has a recess in the outer surface of the bottom of the cup. The tubular member 2 further has a means for defining a second fluid flow path 26 which connects the second portion 16 of the first fluid flow path 12 with the first portion 14 of the first fluid flow path 12 from a position near the second end 6 of the tubular member 2.

In a preferred embodiment of the invention, the tubular member 2 is provided with a seal means adjacent to the first end 4 such as an O-ring 30. In a most preferred embodiment, the first surface 22 of the partition portion 18 is concavely shaped to form a sump which is connected to the recess in the inner bottom of the cup by the orifice 20. The second fluid portion 16 of the first fluid flow path 12 of the tubular member 2 is formed by the recess and serves as as water chamber or reservoir, when the tubular member 2 is positioned in an air gun exhaust chamber.

In a preferred embodiment of the invention, the means for defining the second fluid flow path 26 is partly formed by at least one channel or groove 32 defined between the outer surface 10 of the tubular member 2 and the inner wall of the exhaust chamber, when the tubular member 2 is positioned in the exhaust chamber. It is important that the outside diameter of the tubular member 2 be closely received by the inside diameter of the exhaust chamber so that the passage formed between the channel 32 and the inner wall of the exhaust chamber is well defined. Each channel 32 begins at the second end 6 of the tubular member 2 and terminates adjacent the first end 4 of the tubular member 2. The channels 32 preferably have a generally rectangularly shaped cross section for ease of manufacture (e.g. by milling) and extend generally longitudinally along the outer surface 10 of the tubular member 2. A passage 34 is provided adjacent the first end 4 of the tubular member 2 to connect each channel 32 with the first portion 14 of the first fluid flow path 12. In the drawings, the passages 34 form nozzles or jets 34. In the illustrated embodiment, the jets 34 have a minimum flow path area as measured cross sectionally which is generally equal to or greater than the cross sectional flow path area defined by orifice 20. In a most preferred embodiment, each jet 34 opens into the first portion 14 of the first fluid flow path 12 in a direction oriented inwardly and upwardly toward the first end 4 of the tubular member 2 so that escaping air flow can help sweep out water emitted from the jets 34 when the gun is fired.

Figure 1:
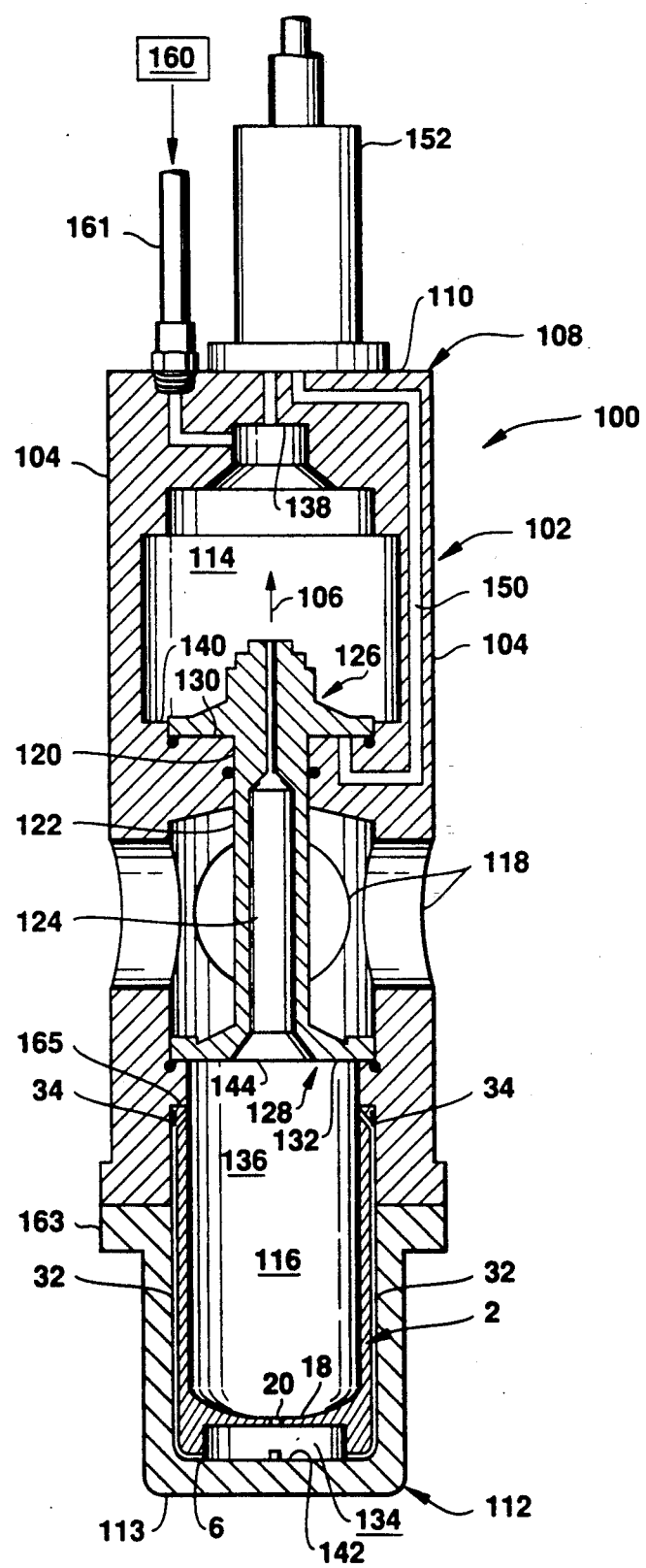
FIG. 1 is a side sectional view of a seismic air gun embodying certain features of the invention when in the armed configuration.
Figure 2:
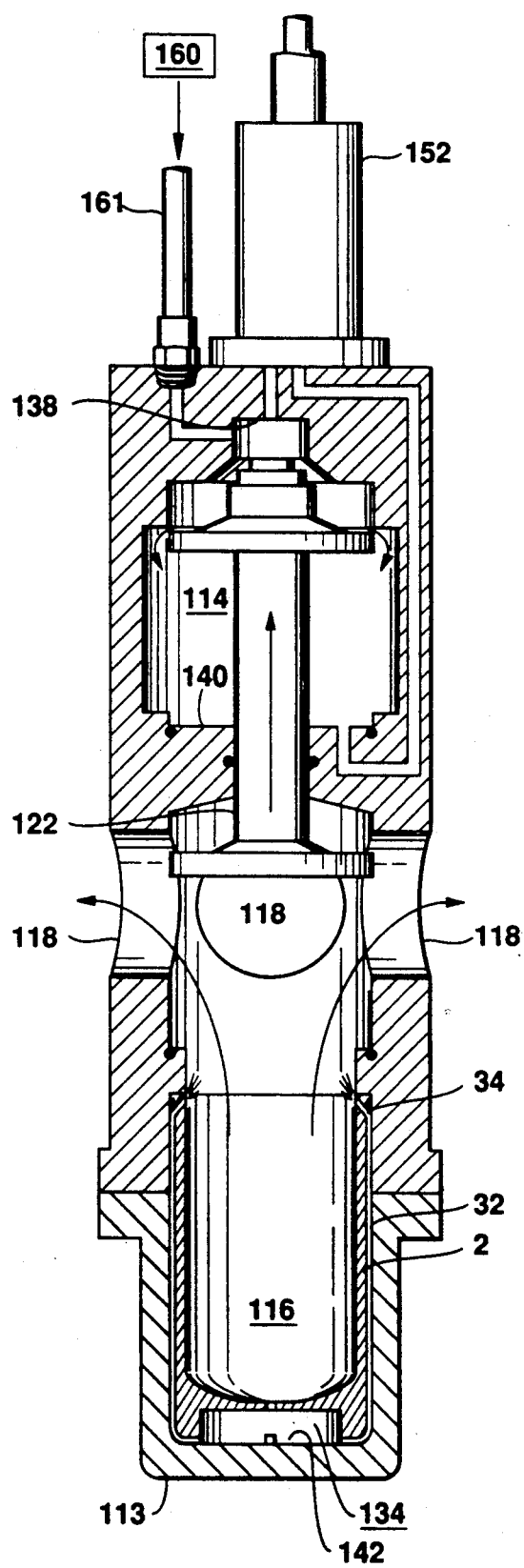
FIG. 2 is a side sectional view of a seismic air gun embodying certain features of the invention when in the fired configuration.

With reference to FIGS. 1 and 2, the tubular member 2 is shown deployed in an air gun 100. The air gun 100 is formed by generally tubular housing 102 defined by a sidewall 104 having a longitudinal axis 106, a first end 108, a closure 110 on the first end 108, a second end 112, and a closure 113 on the second end 112. A control chamber 114 is defined by the housing 102 adjacent to the first end 108. An exhaust chamber 116 is defined by the housing 102 near the second end 112. The outer boundary of the exhaust chamber 116 is defined by the sidewall 104. Exhaust ports 118 extend through the sidewall 104 between the control chamber 114 and the exhaust chamber 116. A valve stem guide 120 is positioned along the longitudinal axis 106 between the exhaust ports 118 and the control chamber 114. A double-ended valve member 122 or shuttle is carried by the valve stem guide 120. The valve member 122 has a hollow stem 124, a first end 126, a second end 128, a disk 130 at the first end 126 and a disk 132 at the second end 128. The valve member 122 is movable from a first position (see FIG. 1) in which the exhaust chamber 116 is isolated from the exhaust ports 118 by the second disk 132 to a second position (see FIG. 2) in which there is communication between the exhaust chamber 116 and the exhaust ports 118.

The tubular member 2 is positioned in the exhaust chamber 116. The tubular member 2 divides the exhaust chamber 116 into a water reservoir 134 and a residual exhaust chamber 136. The second end 6 of the tubular member 2 is positioned adjacent to the closure 113 on the second end 112 of the housing 102, and preferably abuts against the closure 113. The water reservoir 134 is defined between the partition 18 of the tubular member 2 and the closure 113 on the second end 112 of the housing 102. The residual exhaust chamber 136 is formed between the partition 18 and the second disk 132 of the valve member 122. The periphery of the residual exhaust chamber 136 is the inner surface of the tubular member 2, whereas the periphery of the exhaust chamber 116 is the inner surface of sidewall 104. As best shown by FIG. 1, the control chamber 114 preferably has a first end 138 which is adjacent to the first end 108 of the housing 102 and a second end 140 which is opposite from the first end 138. The exhaust chamber 116 preferably has a second end 142 which is adjacent to the second end 112 of the housing 102 and a first end 144 which is opposite from the second end 142. When the valve member 122 is in the first position, the first disk 130 is positioned adjacent the second end 140 of the control chamber 114 and the second disk 132 is positioned adjacent the first end 144 of the exhaust chamber 116.

Disk 130 of the valve member 122 is slightly larger than disk 132 to keep the valve member 122 urged into the first position when the air gun 100 is pressurized. Preferably, the air gun 100 further comprises a means to dislodge the valve member 122 from the first position. The means can be provided by depressurizing the control chamber 114. In the drawings, a means is provided for introducing fluid between the first disk 130 and the exhaust ports 118 to dislodge the valve member 122 from the first position as shown in FIG. 1. In the illustrated embodiment, the means for introducing fluid includes a passage 150 in the housing 102 and a solenoid valve 152 operatively associated with the passage 150. When it is desired to fire the air gun 100, the solenoid valve 152 opens and air flows from the control chamber 114 through the passage 150 to the back face of disk 130. This causes the valve member 122 to lift and move rapidly into the second position as shown in FIG. 2, which is the "fire" position. The air in the exhaust chamber 116 exits through exhaust ports 118. The valve member 122 then moves back into the first position (see FIG. 1) and the chambers 114 and 116 are recharged with compressed air from fluid source 160 via conduit 161.

In use, the apparatus of the invention provides a means for exhausting water from a vertically positioned air gun. The residual exhaust chamber 136 is pressurized with air from source 160 which flows via conduit means 161 into the control chamber 114 and then through the hollow stem 124 of the valve member 122 into the residual exhaust chamber 136. Any water which has accumulated in the residual exhaust chamber 136 drains out of the residual exhaust chamber 136 via the orifice 20 and into the water reservoir 134. Preferably, the chambers 114 and 136 are charged with air to high pressures such as to within the range of 1,000 to 3,000 psi. The solenoid valve 152 is electrically actuated to relieve the fluid pressure holding the valve 122 in the first position. The valve member 122 lifts and residual exhaust chamber 136 is depressurized from the upper end.

Operation of a preferred embodiment of the invention is described as follows. When the residual exhaust chamber 136 is pressurized, the water reservoir 134 equalizes to the same pressure. When water is present in residual exhaust chamber 136, gravity will pull the water down through the orifice 20 into the water reservoir 134. Pressurization of the water reservoir 134 through the orifice 20 will also carry water, if present in the bottom of residual exhaust chamber 136, into the water reservoir 134. Any water present will puddle in the water reservoir 134. When the air gun 100 is fired, the residual exhaust chamber 136 pressure drops causing a large differential pressure between the exhaust chamber 116 and the water reservoir 134. The pressurized air within water reservoir 134, in an attempt to reach equilibrium, will escape, flowing through the jets 34 and the orifice 20. Preferably the orifice 20 is very small, only a few thousandths of an inch in diameter, so that the majority of the water reservoir fluids will flow out the jets 34. Water within the water reservoir 134 will be pushed up the channels 32 and subsequently sprayed out the jets 34. As the water is sprayed, it will mix with the rapidly escaping exhaust chamber air and will be exhausted out of the residual exhaust chamber 136 via the exhaust ports 118.

Water reservoir 134 loses its pressure more slowly than residual exhaust chamber 136. Because of this, a large pressure differential becomes available between the water reservoir 134 and the exhaust ports 118. Any liquid, such as sea water or lake water, which may have accumulated in the water reservoir 134 is thereby caused to flow up the channels 32 and through the jets 34 where it is sprayed into the exhaust chamber 116 and exhausted with escaping air through the ports 118. Any liquid is thereby swept out the upper end of the exhaust chamber 116 by rapid flow of escaping air.

To facilitate carrying the water from the exhaust chamber 116 it is preferable that the passages 34 form jets which are directed toward the exhaust ports 118. The pressure drop along channels 32 and across the jets 34 should be less than the pressure drop across the orifice 20. This ensures that any liquid mixed with air will preferentially flow through the jets 34 rather than through the orifice 20.

The invention may also be used to regulate the exhaust chamber volume of a seismic air gun. The method is especially useful where the air gun has a detachable exhaust chamber housing 163 which is used to define the volume of the exhaust chamber. In a preferred embodiment, the air gun body has an exhaust chamber bore having an inside shoulder 165 which faces the detachable exhaust chamber housing 163. The volume of the exhaust chamber 116 can be changed by detaching the exhaust chamber housing 163 from the housing 102. A closely fitting tubular member 2 is inserted into the detachable exhaust chamber housing 163. Where the tubular member 2 has a diameter such that it closely fits the inside of the detachable exhaust chamber housing 163 and a length so that the tubular member 2 is tightly secured between the shoulder 165 and the bottom of the detachable exhaust chamber housing 163 when the detachable exhaust chamber housing 163 is reattached, a convenient method is provided for regulating the air gun exhaust chamber volume.

While certain preferred embodiments of the invention have been described herein, the invention is not to be construed as being so limited, except to the extent such limitations are found in the claims.

What is claimed is:

1. A tubular member for use within a seismic device; said tubular member having a first end, a second end, an inside surface, and an outside surface; said inside surface of the tubular member defining a first fluid flow path which extends from the first end of the tubular member to the second end of the tubular member; said first fluid flow path being divided into a first portion which is located near the first end of the tubular member and a second portion which is located near the second end of the tubular member by an inwardly extending partition portion of the tubular member which extends across the first fluid flow path; said partition having a first surface facing the first end of the tubular member and a second surface facing the second end of the tubular member and an orifice extending from the first surface to the second surface connecting the first portion of the first fluid flow path with the second portion of the first fluid flow path; said tubular member further having a means for defining a second fluid flow path connecting the second portion of the first fluid flow path with the first portion of the first fluid flow path; said means for defining the second fluid flow path comprising at least one channel, extending generally longitudinally along the outer surface of the tubular member, and at least one passage connecting the channel with the first portion of the first fluid flow path; said channel beginning at the second end of the tubular member and terminating adjacent to the first end of the tubular member and said passage formed adjacent to the first end of the tubular member.

2. A tubular member as in claim 1, wherein the first portion of the first fluid flow path has at least 10 times the volume of the second portion of the first fluid flow path.

3. A tubular member as in claim 1 wherein the means for defining the second fluid flow path at its maximum constriction provides at least the same flow path area as the orifice extending from the first surface to the second surface.

4. A tubular member as in claim 1 wherein a sump is formed in the first surface of the partition portion and the orifice through the partition portion extends from the sump to the second portion of the first fluid flow path.

5. A seismic device for generating acoustic energy in a liquid medium; said seismic device comprising:
   (a) a generally tubular housing having a sidewall, a longitudinal axis, a first end, a closure on the first end, a second end, a closure on the second end, a control chamber adjacent the first end, an exhaust chamber adjacent the second end, a plurality of exhaust ports through the sidewall located between the control chamber and the exhaust chamber, and a valve stem guide positioned along the longitudinal axis between the exhaust ports and the control camber;
   (b) a valve member having a hollow stem, a first end, a first disk at the first end, a second end, and a second disk at the second end; the stem of the valve member being slidably mounted in the valve stem guide; the valve member being movable from a first position in which the exhaust chamber is isolated from the exhaust ports by the second disk to a second position in which there is communication between the exhaust chamber and the exhaust ports; and
   (c) a sleeve having a first end, a second end, an inside surface, and an outside surface positioned in the exhaust chamber with the second end of the sleeve being positioned adjacent to the closure on the second end of the tubular housing; said sleeve having an inside partition extending across the inside surface near the second end of the sleeve to form a chamber for water accumulation between the partition and the closure on the second end of the housing and a residual exhaust chamber between the partition and the second disk, said partition having an orifice therethrough connecting the water accumulation chamber and the residual exhaust chamber; said sleeve further defining a bore hole extending from the outer surface of the sleeve inwardly to the inner surface of the sleeve near the first end of the sleeve and a channel extending along the outer surface of the sleeve leading from the water accumulation chamber to the borehole.

6. The seismic device as in claim 5 wherein the control chamber has a first end adjacent to the first end of the housing and second end which is opposite from the first end; the exhaust chamber has a second end which is adjacent to the second end of the housing and a first end which is opposite from the second end; the first disk of the valve member being adjacent the second end of the control chamber and the second disk of the valve member being adjacent the first end of the exhaust chamber when the valve member is in the first position.

7. The seismic device as in claim 6 further comprising means for introducing fluid between the first disk of the valve member and the exhaust ports to permit the valve member to move to the second position.

8. The seismic device as in claim 7 further comprising a source of fluid connected to the control chamber.

9. A method for exhausting eater from a near vertically positioned exhaust chamber of a seismic device; said exhaust chamber having an upper end and a lower end, said method comprising:
   (a) pressurizing the exhaust chamber with air;
   (b) gravity draining the water from the lower end of the exhaust chamber through an orifice;
   (c) collecting the water in a water reservoir beneath the orifice;
   (d) depressurizing the exhaust chamber from the upper end of the exhaust chamber; and
   (e) spraying a portion of the water from the water reservoir back into the exhaust chamber so that the water is swept out the upper end of the exhaust chamber by flow of the air.

10. A method as in claim 9 wherein the water is sprayed into the exhaust chamber through jets.

11. A method as in claim 10 wherein the pressure drop between the water reservoir and the jets is less than the pressure drop between the water reservoir and the orifice when the exhaust chamber is depressurized.

12. A method as in claim 11 wherein the jets are positioned between the upper end and the lower end of the exhaust chamber and are oriented inwardly and upwardly.

13. A method as in claim 12 further comprising flowing a portion of the water through passages extending between the water reservoir and the jets.

* * * * *